US010683591B1

(12) United States Patent
Podhajny et al.

(10) Patent No.: US 10,683,591 B1
(45) Date of Patent: Jun. 16, 2020

(54) ITEMS WITH FABRIC HINGES (71) Applicant: Apple Inc., Cupertino, CA (US)

(72) Inventors: Daniel A. Podhajny, San Jose, CA (US); Daniel D. Sunshine, Sunnyvale, CA (US); Didio V. Gomes, Sunnyvale, CA (US); Kevin M. Robinson, Sunnyvale, CA (US); Mariel L. Lanas, Palo Alto, CA (US); Ari P. Miller, San Francisco, CA (US); Houtan Farahani, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/276,203

(22) Filed: Feb. 14, 2019

Related U.S. Application Data (60) Provisional application No. 62/661,581, filed on Apr. 23, 2018.

(51) Int. Cl.
G06F 1/16 (2006.01)
D03D 1/00 (2006.01)
A45C 11/00 (2006.01)
D03D 7/00 (2006.01)
D03D 11/00 (2006.01)
E05D 1/00 (2006.01)

(52) U.S. Cl.
CPC ............... *D03D 7/00* (2013.01); *A45C 11/00* (2013.01); *D03D 1/0088* (2013.01); *D03D 11/00* (2013.01); *E05D 1/00* (2013.01); *G06F 1/1637* (2013.01); *G06F 1/1662* (2013.01); *G06F 1/1681* (2013.01); *A45C 2011/002* (2013.01); *A45C 2011/003* (2013.01); *D03D 2700/0137* (2013.01); *D03D 2700/0144* (2013.01); *D03D 2700/0166* (2013.01); *E05Y 2900/606* (2013.01)

(58) Field of Classification Search
CPC ........ D03D 7/00; D03D 11/00; D03D 1/0088; D03D 2700/0166; D03D 2700/0137; D03D 2700/0144; G06F 1/1662; G06F 1/1637; G06F 1/1681; E05D 1/00; A45C 2011/003; A45C 11/00; A45C 2011/002; E05Y 2900/606
See application file for complete search history.

(56) References Cited

U.S. PATENT DOCUMENTS

4,808,771 A 2/1989 Orr, Jr.
4,911,683 A 3/1990 Legge et al.
(Continued)

Primary Examiner — Rockshana D Chowdhury
(74) Attorney, Agent, or Firm — Treyz Law Group, P.C.; G. Victor Treyz; Kendall W. Abbasi (57) ABSTRACT An item such as a removable device cover or a portable electronic device may have a fabric hinge. The item may have first and second structures that are configured to rotate relative to each other. The fabric hinge may have first and second fabric layers that are coupled to the first structure and third and fourth fabric layers that are coupled to the second structure. A center portion of the fabric hinge may have one side that is coupled to the first and second fabric layers and an opposing second side that is coupled to the third and fourth fabric layers. In the center portion, first strands of material may extend outwardly into the first and fourth fabric layers and second parallel strands that are interspersed with the first strands may extend outwardly into the second and third fabric layers.

21 Claims, 12 Drawing Sheets (56) References Cited

U.S. PATENT DOCUMENTS

| | | | | |
|---|---|---|---|---|
| 5,607,054 | A | * | 3/1997 | Hollingsworth ...... G06F 1/1628 206/305 |
| 6,068,039 | A | | 5/2000 | Judkins |
| 2002/0038684 | A1 | | 4/2002 | Puppin |
| 2006/0228970 | A1 | | 10/2006 | Orr et al. |
| 2007/0000091 | A1 | * | 1/2007 | Priegelmeir .............. B32B 1/04 16/372 |
| 2010/0133725 | A1 | | 6/2010 | McCaskey |
| 2011/0216064 | A1 | * | 9/2011 | Dahl ..................... G06F 1/1616 345/428 |
| 2016/0041589 | A1 | * | 2/2016 | Tazbaz .................. G06F 1/1681 361/679.06 |
| 2016/0187935 | A1 | * | 6/2016 | Tazbaz .................... G06F 1/163 361/679.03 |

* cited by examiner

ITEMS WITH FABRIC HINGES

This application claims priority to U.S. provisional patent application No. 62/661,581 filed on Apr. 23, 2018, which is hereby incorporated by reference herein in its entirety.

FIELD

This relates generally to items with fabric structures and, more particularly, to items having fabric hinges.

BACKGROUND

Hinges such as hinges for laptop computers have interlocking metal parts. These parts can be bulky and unattractive. Covers for devices such as tablet computers may have structures formed from flexible layers of material. A flexible layer of material such as a plastic sheet may be sufficiently flexible to allow a cover or other item to bend over a desired range of angles, but provides limited control and stability.

SUMMARY

An item such as a portable electronic device or a cover for an electronic device may have a fabric hinge. The item may have first and second structures that are configured to rotate relative to each other. The first and second structures may form portions of a cover, may form housing portions for a portable electronic device, may include electrical components such as one or more displays, keyboards, touch sensors, and/or other electrical components, and/or may form other structures in the item.

The fabric hinge may have first and second fabric layers that are coupled to the first structure and third and fourth fabric layers that are coupled to the second structure. A center portion of the fabric may have one side that is coupled to the first and second fabric layers and an opposing second side that is coupled to the third and fourth fabric layers.

In the center portion, first strands of material may extend outwardly into the first and fourth fabric layers and seconds strands that are interspersed amongst the first strands may extend outwardly into the second and third fabric layers.

The first and second structures may have bearing surfaces that bear against each other as the first and second structures are rotated relative to each other. Rotational orientation detents and other structures may be formed from the first and second structures. In some configurations, electrical paths may be formed through the hinge structures to pass signals between electrical components in the first structure and electrical components in the second structure.

DETAILED DESCRIPTION

Items such as electronic devices, covers for electronic devices, and other items may include hinges. The hinges may be formed using fabric. Fabric hinges may be formed from woven fabric, knit fabric, fabric with braided strands of material, and/or other intertwined strands of material. Illustrative configurations in which items are provided with woven fabric hinges are sometimes described herein as an example.

A woven fabric hinge includes interwoven strands of material. The strands of material may include polymer strands, conductive strands including metal and/or polymer cores and/or polymer coatings, may include strands of natural materials such as cotton or wool, and/or may include strands of other materials. The strands of material may be monofilaments and/or multifilament yarn.

Figure 1:
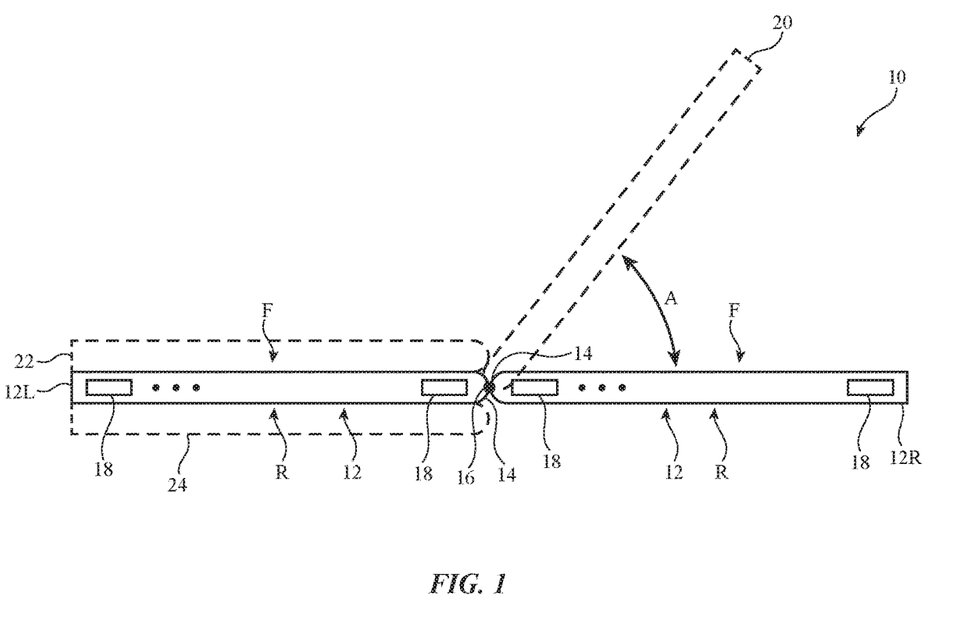
FIG. 1 is a schematic diagram of an illustrative item with a fabric hinge accordance with an embodiment.

FIG. 1 is a schematic diagram of an illustrative item with a fabric hinge. Item 10 of FIG. 1 has a housing such as housing 12 with portions 12L and 12R that rotate relative to each other about hinge axis 16. Each housing portion (e.g., portion 12L and/or portion 12R) may include one or more housing structures (e.g., frame structures, housing walls forming exterior surfaces for a device enclosure, hinge members that are coupled to other housing structures while forming bearing surfaces and/or other portions of a hinge, and/or other housing structures).

Components 18 may be formed in housing 12. In some arrangements, front faces F of housing portions 12L and 12R may include input-output devices such as displays, keyboard, trackpads, and other electrical components 18 that receive input from a user and that supply output to a user. The opposing sides of housing portions 12L and 12R, which may sometimes be referred to as rear faces R, may contain planar and/or curved housing structures (e.g., a housing wall formed from glass, polymer, metal, other materials, and/or combinations of these materials) and/or electrical components 18 may be mounted on rear faces R. For example, displays, keyboard, touch pads, and/or other components 18 may be mounted on rear faces R. In some configurations, duplicate components may be formed in portions 12R and 12L. For example, a first display may be formed in housing portion 12R and a second display may be formed in housing portion 12L.

A fabric hinge may be formed along axis 16 to hold housing portions 12L and 12R together while allowing portions 12L and 12R to be rotated to different angular orientations with respect to each other. As shown in the example of FIG. 1, housing portions 12L and 12R may, if desired, be placed in a flat configuration in which both housing portion 12L and housing portion 12R lie in a common plane. When it is desired to enhance the visibility of a display in housing portion 12R or when it is otherwise desired to change the orientation of housing portion 12R relative to housing portion 12L, housing portion 12R may be rotated about axis 16 until housing portion 12R reaches a position such as position 20 in which housing portion 12R lies in a plane that is oriented at a non-zero angle A with respect to the plane of portion 12R. In an illustrative arrangement, further rotation of housing portion 12R about axis 16 is possible. For example, housing portion 12R may be rotated until angle A is equal to 180° (e.g., housing portion 12R may be placed in a front-to-front configuration with housing portion 12L as illustrated by position 22 for housing portion 12R). In another illustrative arrangement, housing portion 12R may be rotated clockwise to position 24, so that housing portions 12L and 12R are oriented in a rear-to-rear configuration.

Housing portions 12L and 12R may have surfaces 14 that bear against each other during rotation. These mating surfaces 14, which may sometimes be referred to as bearing surfaces or hinge surfaces, may have curved profiles or other suitable profiles that allow the housing of device 10 to fold on itself in a front-to-front and/or rear-to-rear configuration (if desired). A single hinge axis 16 is shown in FIG. 1, but item 10 may, if desired, have two, three, or more than three hinge axes and associated fabric hinges.

Item 10 may be a foldable computer such as a laptop computer, a foldable tablet computer or foldable cellular telephone, a cover for a tablet computer, a cover for a cellular telephone, a cover for a laptop computer, a foldable cover with a keyboard or other input-output circuitry, a wristwatch device, a media player, an accessory such as a keyboard or mouse, audio equipment, electrical equipment embedded in furniture or a vehicle, a wireless charging mat, or other electronic equipment with structures that rotate relative to each other about a hinge axis.

In some configurations, such as when item 10 is a cover, item 10 may or may not include electrical components (e.g., an optional keyboard, circuitry for coupling the keyboard to an external electronic device, a supplemental battery, etc.). In other configurations such as when item 10 is a tablet computer, cellular telephone, laptop computer, or other portable electronic device, electrical components 18 are mounted in housing 12.

Electrical components 18 may include control circuitry. Control circuitry in components 18 may be formed from one or more integrated circuits such as microprocessors, microcontrollers, application-specific integrated circuits, digital signal processors, etc. Control circuitry in components 18 may be used to control the operation of item 10 by controlling electrically controllable (electrically adjustable) components in item 10 and may be used to support communications with external electrical equipment. Components 18 may, for example, include wired and/or wireless communications circuitry (e.g., radio-frequency transceiver circuitry, antennas, etc.). In some configuration, inductive wireless power coils may be included in components 18 (e.g., to support the transmission and/or reception of wireless power signals).

Components 18 may be formed from integrated circuits, semiconductor dies, discrete components such as resistors, inductors, and capacitors, and/or other electrical components. Input-output devices in components 18 may include components for providing a user of item 10 with output (e.g., light-emitting diodes, lasers, and other light-producing components for emitting light as part of a pixel array of other output device, audio transducers, haptic output devices such as piezoelectric devices for producing vibrations and other haptic output, antennas for transmitting wireless signals, communications circuits for transmitting data over wired communications links, etc.). Input-output devices in components 18 may also include components for gathering input from a user and from a user's surroundings. Components 18 may, for example, include temperature sensors, pressure sensors, force sensors, gas sensors (e.g., carbon monoxide sensors), particulate sensors, moisture sensors, light sensors, magnetic sensors, capacitive sensors (e.g., sensors for touch or proximity measurements), gesture sensors, image sensors, proximity sensors, touch sensors, button sensors (e.g., switches coupled to movable button members or button regions), sensors that gather other types of input and/or hybrid sensors that include sensor functionality from any two or more of these sensors. Input and output can also be provided using accessories (e.g., other items 10 such as pointing devices, etc.). Components 18 may be formed in one or both of housing portions 12L and 12R and, if desired, signal paths such as conductive paths formed through a fabric hinge may be used in conveying power and/or data signals between these components.

The fabric hinge formed along hinge axis 16 and, if desired, other portions of item 10 such as portions of housing 12, can include strands of material. The strands of material may be embedded in polymer or other binder, may be free of binder, may be intertwined to form fabric, or may be otherwise incorporated into item 10. Strands can be formed from polymer, metal, glass, and/or other materials. In some configurations, strands of material in item 10 include multiple types of material (e.g., embedded conductive paths formed from metal wires, polymer, etc.). Wires can be insulating (e.g., when formed of plastic, glass, or other dielectric) and/or may be conductive (e.g., when a polymer strand is coated with a metal layer and/or one or more metal lines is coated with polymer to form a strand).

The fabric of a fabric hinge or other fabric in item 10 may have properties that vary across the fabric. These properties may include optical properties such as color, light reflectance, light absorption, and/or light transmission, mechanical properties such as stiffness, moisture repellency, abrasion resistance, etc., electrical properties such as electrical conductivity, input-output capabilities (e.g., display capabilities, acoustic input and output capabilities, sensing capabilities), etc. Properties such as these may be varied by adjusting the amount of binder or other material that is incorporated into the fabric, by adjusting the fabric construction (strands per inch, number of fabric layers, weave pattern, etc.) used in forming the fabric, and/or adjusting the composition of individual strands of material in the fabric. In some configuration, fabric may have strands of material with properties that vary along their lengths (e.g., stiffness, diameter, optical properties, etc.).

Figure 2:
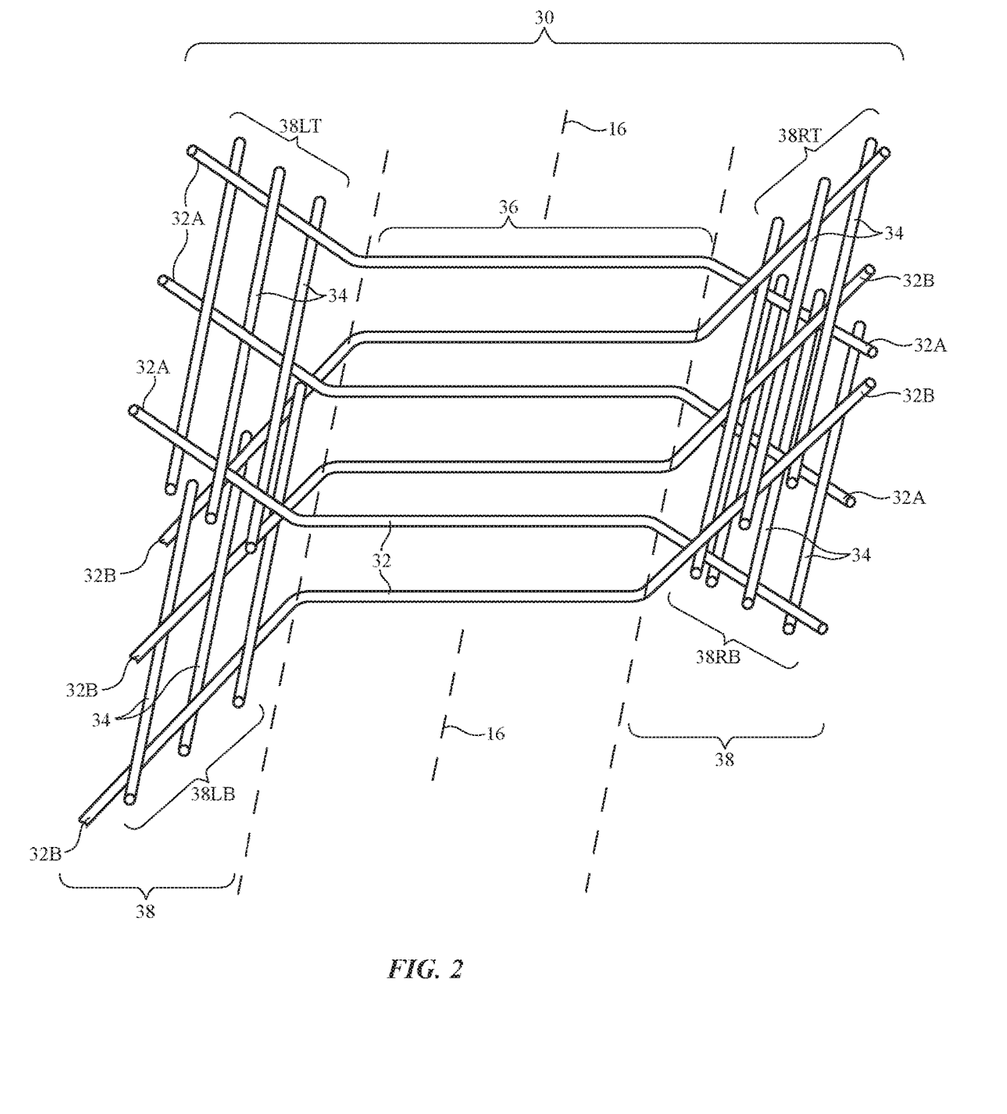
FIG. 2 is perspective view of an illustrative fabric hinge in accordance with an embodiment.

FIG. 2 is a perspective view of an illustrative fabric hinge. As shown in FIG. 2, fabric hinge 30 includes outer portions (outer hinge portions) 38 and includes center portion (center hinge portion) 36 coupled between outer portions 38. Center portion 36 is formed from a layer of strands 32 that run perpendicular to hinge axis 16. With an illustrative configuration, hinge 30 is formed by weaving weft and warp strands together. Strands 32 may be warp or weft strands and perpendicular (orthogonal) strands 34 may respectively be weft or warp strands. In the illustrative example described herein, strands 32 are weft strands and strands 34 are warp strands. Any desired patterns may be used in interweaving strands 32 and strands 34 (e.g., a plain weave, basket weave, etc.).

Center portion 36 contains weft strands 32, but does not contain warp strands 34 and is free of polymer binding material (e.g., fusible strands, cured liquid polymer, thermoplastic polymer, etc.). As a result, strands 32 are able to move relative to each other and allow hinge 30 to bend about axis 16.

In outer regions 38, weft strands 32 are divided into first and second fabric layers. In the illustrative configuration of FIG. 2, weft strands 32A are interwoven with warp strands 34 to form fabric layer 38LT on the upper left of FIG. 2. On the lower right of FIG. 2, weft strands 32A are interwoven with warp strands 34 to form fabric layer 38RB. Weft strands 32B are interwoven with warp strands 34 to form fabric layer 38LB on the lower left of FIG. 2 and are interwoven with warp strands 34 to form fabric layer 38RT on the upper right of FIG. 2. Hinge 30 therefore includes at least two fabric layers in each of outer portions 38 (e.g., layers 38LT and 38LB in outer portion 38 on the left of center portion 36 and layers 38RT and 38RB on the in outer portion 38 on the right of center portion 36). Weft strands 32A are interspersed with weft strands 32B (e.g., weft strands 32A and weft strands 32B alternate along axis 16 in an odd/even pattern, groups of weft strands 32A alternate with groups of weft strands 32B, and/or other interleaving pattern may be used to distribute weft strands 32A among weft strands 32B).

Figure 3:
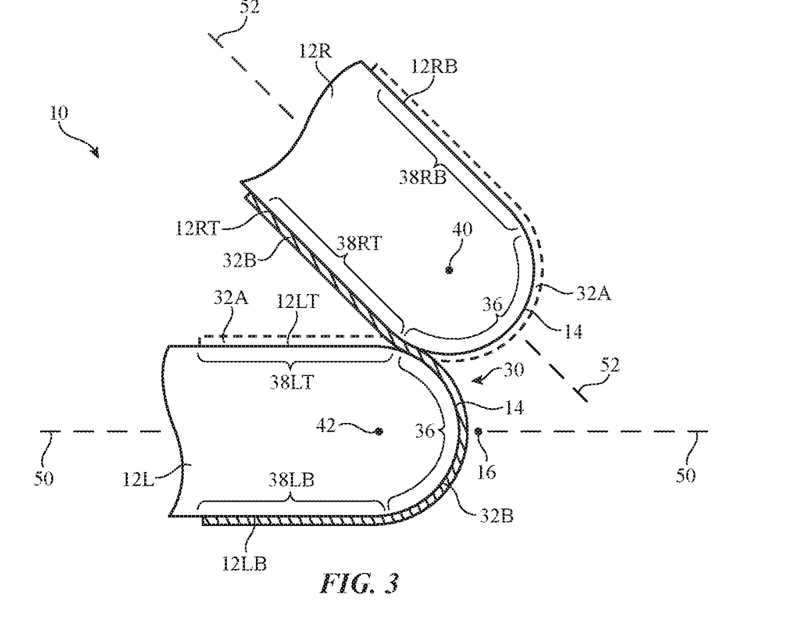
FIGS. 3 and 4 are side views of structures such as housing structures in an item joined using a fabric hinge in accordance with an embodiment.
Figure 4:
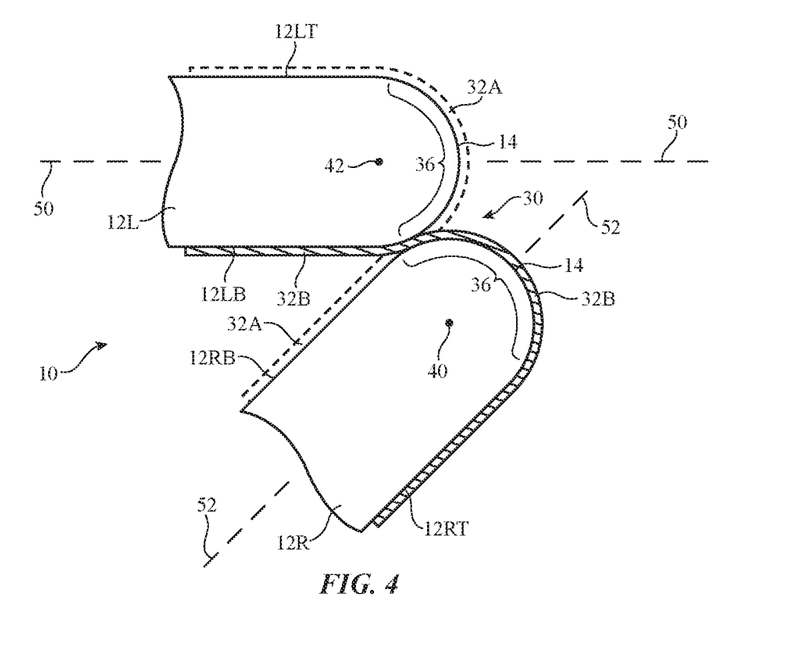

The operation of an illustrative hinge in item 10 is shown in FIGS. 3 and 4. In the configuration of FIG. 3, housing portion 12R has been rotated counterclockwise relative to housing portion 12L so that portion 12R lies in a plane (plane 52) that is oriented at a 135° angle with respect to the plane in which portion 12L lines (plane 50). In the configuration of FIG. 4, housing portion 12R has been rotated clockwise so that plane 52 is now oriented at a −45° angle with respect to plane 50. Hinge 30 and item 10 may be configured to allow any suitable degree of rotation (e.g., +/−180° of rotation or less).

In the example of FIGS. 3 and 4, bearing surfaces 14 are semicircular (e.g., each surface forms a half-circle). The half circle formed by bearing surface 14 (e.g., the surface of the semicircular portion of housing portion 12R) has a radius originating at center point 40. The half circle of mating bearing surface 14 in housing portion 12L has a radius originating at center point 42. These half-circle bearing surfaces may have the same length (e.g., half of the circumference of the circle formed by the radiuses extending from center points 40 and 42, respectively) and/or bearing surfaces 14 on portions 12R and 12L may have different lengths around center points 40 and 42. As an example, portion 12L may be thicker and may have a longer curved bearing surface 14 around center point 42 than portion 12R (which may be thinner and may have a shorter curved bearing surface extending around center point 40). By adjusting the shapes and sizes of bearing surfaces 14 of housing portions 12L and 12R, the amount of angular rotation and other attributes of the hinge in item 10 may be adjusted.

To hold hinge 30 in place, fabric layer 38RT may be coupled to a surface of housing portion 12R such as surface 12RT and fabric layer 38RB may be attached to a surface of housing portion 12R such as surface 12RB (e.g., using clamps, adhesive, interlocking structures that pass through fabric openings, and/or other attachment mechanisms). Similarly, fabric layer 38LT may be attached to surface 12LT of portion 12L and fabric layer 38LB may be attached to surface 12LB of portion 12L.

Strands 32 in center portion 36 of fabric hinge 30 are not solidly attached to bearing surfaces 12 of housing portions 12R and 12L and are therefore free to move as hinge 30 flexes. As a result, the strands in center portion 36 of fabric hinge 30 wrap around different lengths of bearing surfaces 12 as housing portions 12R and 12L rotate relative to each other. Consider, as an example, the scenario of FIG. 3. In this position, most of strands 32A in center region 36 are wrapped around bearing surface 14 of housing portion 12R and most of strands 32B in region 36 are wrapped around bearing surface 14 of housing portion 12L. When housing portions 12L and 12R are placed into the orientation of FIG. 4, however, most of strands 32A in center region 36 are wrapped around bearing surface 14 of housing portion 12L and most of strands 32B in center region 36 are wrapped around bearing surface 14 of housing portion 12R. Because interspersed strands 32A and 32B are not constrained by warp strands 34 in center region 36, hinge 30 can flex freely as strands 32A and 32B move relative to each other in center region 36 while still exhibiting tight and well controlled hinge behavior.

Figure 5:
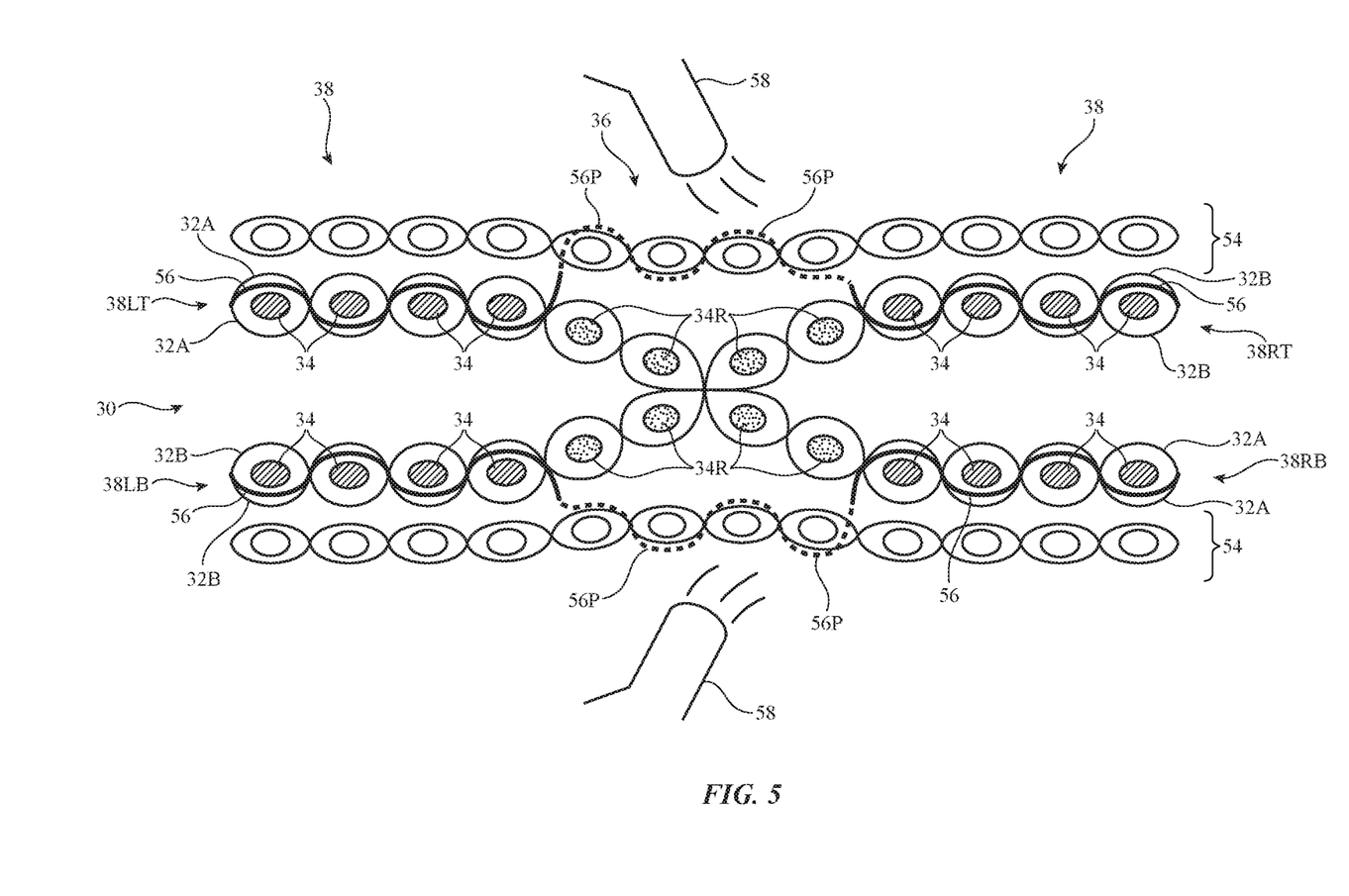
FIG. 5 is a cross-sectional side view of a fabric hinge during fabrication using sacrificial fabric layers in accordance with an embodiment.

FIG. 5 is a cross-sectional side view of fabric hinge 30 during an illustrative manufacturing process using sacrificial fabric layers. As shown in FIG. 5, hinge 30 may be woven so that there are two fabric layers 38LT and 38RT on the left of center portion 36 and two fabric layers 38RT and 38RB on the right of center portion 36. In center portion 36, weft strands 32A from layer 38LT cross weft strands 32B and thereby extend from upper left layer 38LT into lower right layer 38RB. Weft strands 32B cross strands 32A and extend from lower left layer 38LB into upper right layer 38RT. Removable warp strands 34R are initially intertwined with weft strands 32 in center region 36, but are removed before fabrication of hinge 30 is complete.

To help secure the warp and weft strands in the fabric layers of outer regions 38, fusible strands of material such as fusible weft strands 56 may be woven into the fabric. Fusible weft strands 56 may be formed from meltable polymer weft strands that serve as a polymer binding material when heated. In center portion 36, fusible weft strands 56 are woven into sacrificial fabric layers 54. In outer portions 38, fusible weft strands 56 are woven into layers 38LT, 38LB, 38RT, and 38RB. Fusible material is not desired in center region 36, because strands 32A and 32B should be free to move relative to each other in center region 36. Accordingly, portion 56P of fusible strands 56 is removed from fabric hinge 30. This can be accomplished, for example, by applying heat to portion 36P with heating elements 58 to soften and weaken strands 56 while pulling sacrificial layers 54 away from center portion 36.

Figure 6:
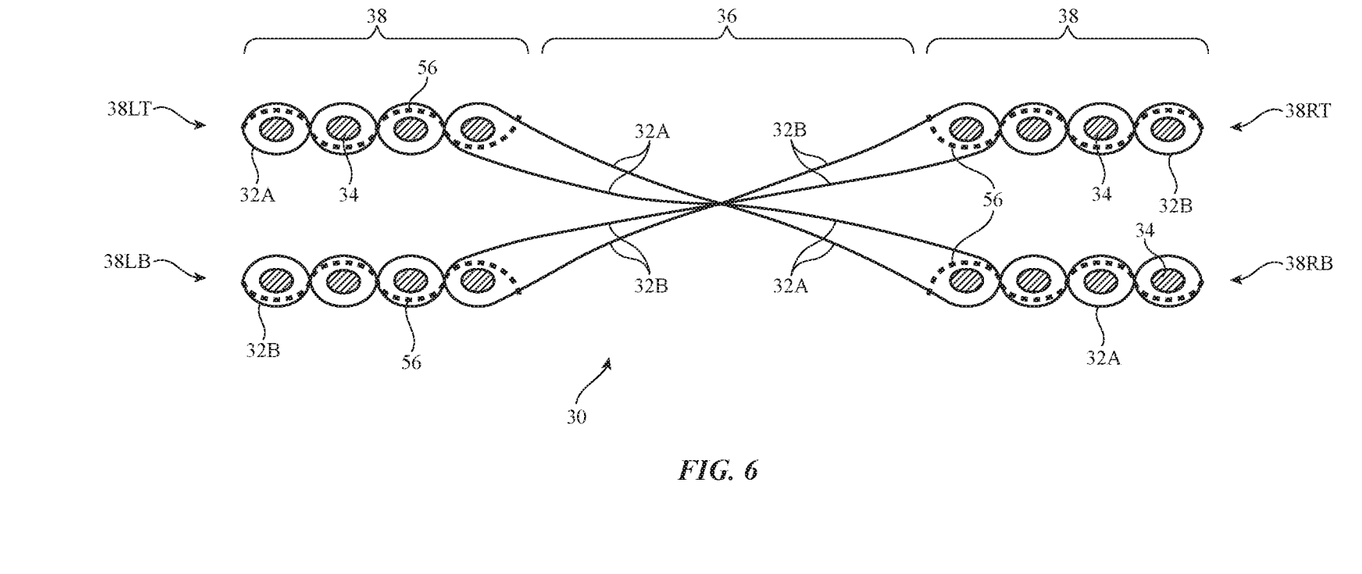
FIG. 6 is a cross-sectional side view of a fabric hinge formed using a fabrication process of the type illustrated in FIG. 5 in accordance with an embodiment.

After removing portions 56P, a left non-stick member can be temporarily placed between layers 38LT and 38LB and a right non-stick member can be temporarily placed between layers 38RT and 38RB. Heat and, if desired, pressure, can then be applied to soften and/or melt the fusible material of strands 56 and thereby set the fabric in outer portions 38. The non-stick members can then be removed and temporary warp strands 34R can be removed from center portion 36. Following stretching along the length of weft strands 32 to remove residual waviness in weft strands 32 in region 36, hinge 30 is complete and may appear as shown in FIG. 6. If desired, openings may be cut in one or more of the fabric layers in outer portions 38 (e.g., to facilitate mounting to protruding portions of housing 12, fasteners, etc. as hinge 30 is assembled into item 10).

The strands that form hinge 30 may include any suitable materials. For example strong materials such as para-aramid or other strong polymers may be used in forming strands 32 (e.g., to help allow hinge 30 to be tensioned). Temporary warp strands 34R may be formed from a slippery material such as nylon (e.g., nylon monofilaments). Other warp strands 34 and/or weft strands 32 may be formed from polyester, para-aramid, and/or other materials. Metal and other conductive materials can be formed in the strands (e.g., weft strands 32) to carry signals (e.g., to carry power and/or data signals between components 18 in housing portions 12L and 12R across hinge axis 16). Multifilament strands (yarn) and/or monofilaments may be used in forming hinge 30.

Figure 7:
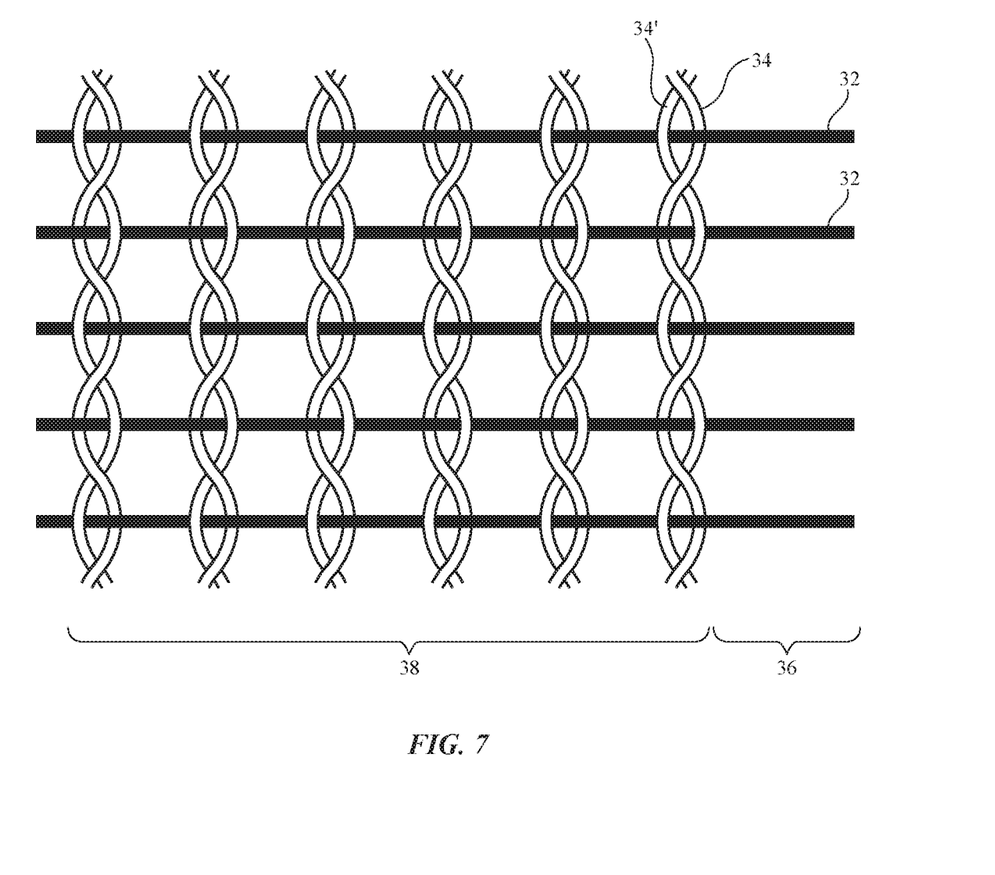
FIG. 7 is a top view of a portion of a fabric structure containing a leno weave fabric layer that may be used in a fabric hinge in accordance with an embodiment.

If desired, warp strands 34 may be secured in outer portions 38 using a leno weave. This type of arrangement is shown in FIG. 7. As shown in FIG. 7, instead of removing fusible strands 56 from center portion 36, the fabric layers of hinge 30 may be constructed so that warp strands 34 are secured using intertwined strands 34'. If desired, strands 34' may include fusible material and can be set under heat and pressure to form fused fabric layers in outer portion 38, as described in connection with fusible strands 56 of FIGS. 5 and 6. Additional polymer binder (e.g., liquid polymer) may also be incorporated into the fabric of outer portions 38, if desired.

Figure 8:
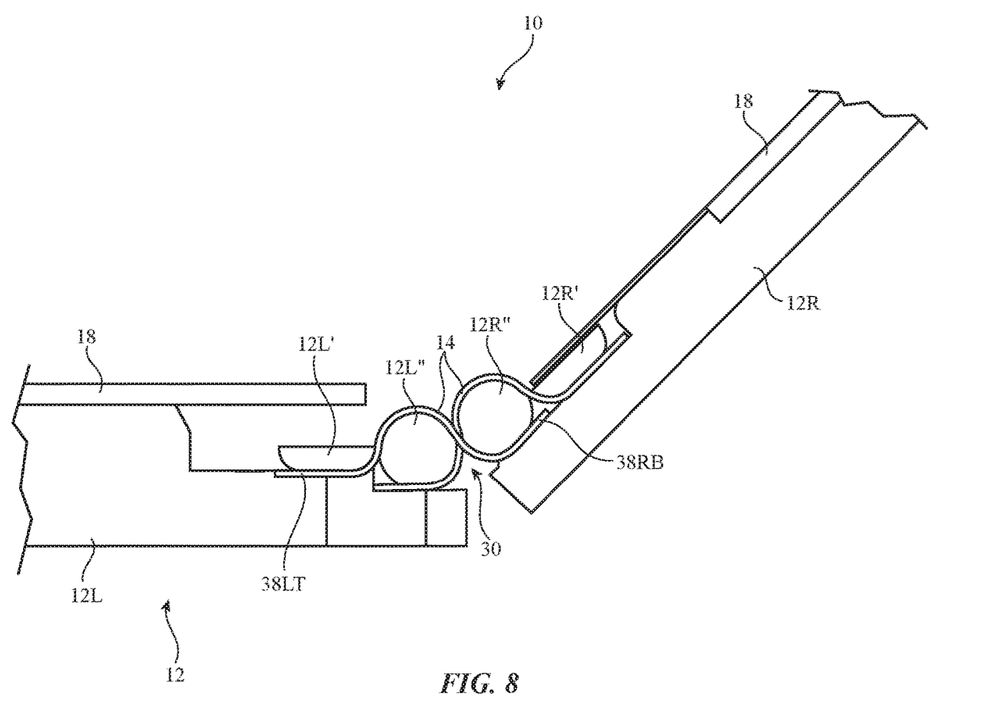
FIG. 8 is a cross-sectional side view of an illustrative electronic device such as a laptop computer with a fabric hinge in accordance with an embodiment.

FIG. 8 is a cross-sectional side view of a portion of item 10 in the vicinity of hinge 30. As shown in FIG. 8, housing 12 of item 10 may include portions such as clamp members 12L' and 12R' to help clamp the fabric layers of hinge 30 to other portions of housing 12 (e.g., to portions 12L and 12R). Housing members with rounded surfaces such as illustrative cylindrical rod housing members 12L" and 12R" may be used in forming bearing surfaces 14. In general housing 12 may be formed from one or more joined members (e.g., portion 12R and portion 12L may each include one or more housing portions that are coupled together). In the example of FIG. 8, item 10 may be a foldable portable electronic device such as a laptop computer or foldable tablet computer (or foldable phone). Component 18 on portion 12L may be, for example, a keyboard or touch screen display and component 18 on portion 12R may be, for example, a display.

Figure 9:
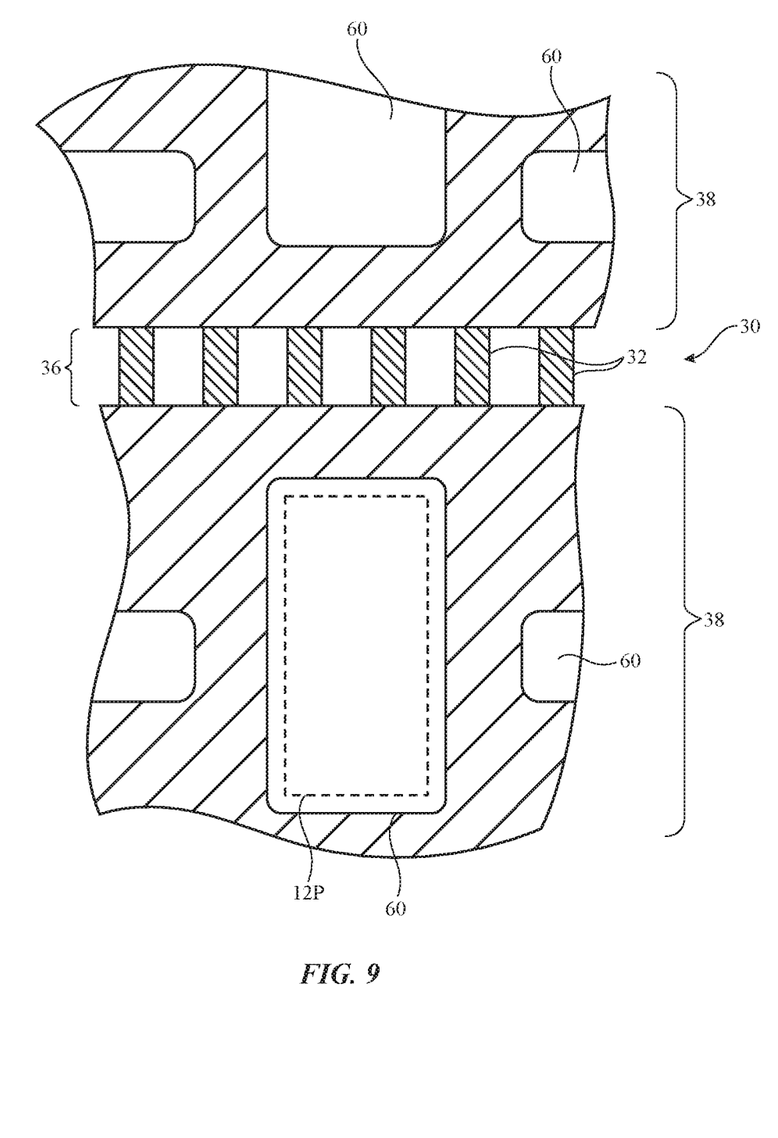
FIG. 9 is a top view of an illustrative fabric hinge with fabric openings in accordance with an embodiment.

FIG. 9 is a top view of hinge 30 showing how fabric layers in outer portions 38 may be provided with openings 60. Openings 60 may be configured to receive protruding portions of housing 12 (see, e.g., illustrative housing protrusion 12P), fasteners such as screws, and/or other locking features on housing 12. This may help tension strands 32 in hinge 30 when hinge 30 is incorporated into item 10.

Figure 10:
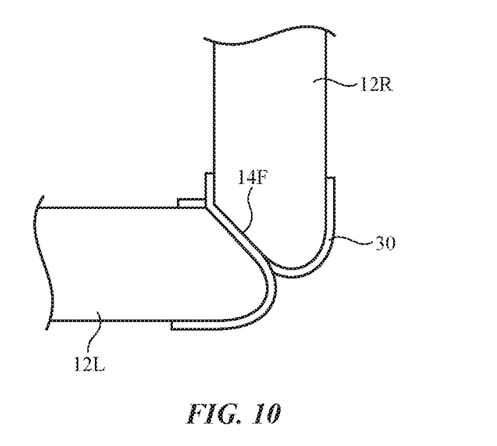
FIG. 10 is a cross-sectional side view of an illustrative fabric hinge coupled to a pair of housing structures having flat detents on otherwise curved bearing surfaces in accordance with an embodiment.
Figure 11:
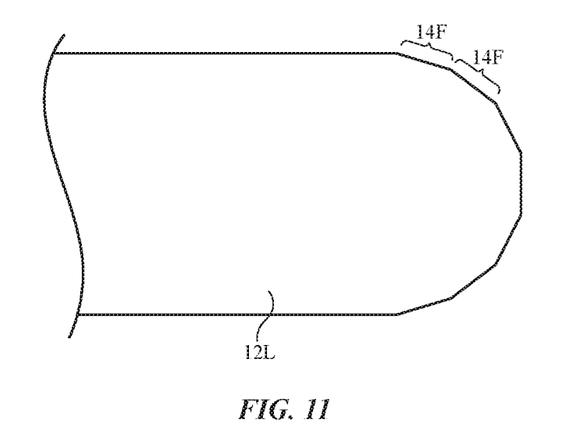
FIG. 11 is a cross-sectional side view of an illustrative housing structure having bearing surfaces with multiple planar detent regions in accordance with an embodiment.

If desired, bearing surfaces 12 may include one or more planar surfaces such as illustrative planar surfaces 14F of FIG. 10. Surfaces 14F in the illustrative configuration of FIG. 10 are oriented so that housing portions 12L and 12R preferentially rest at a detent associated with a 90° orientation. Detents in one or more additional angular orientations between housing portions 12L and 12R may also be formed by creating appropriate flattened surface regions on bearing surfaces 14, if desired. As shown in FIG. 11, as an example, there may be numerous flattened bearing surface areas 14F on each bearing surface 14, thereby providing for numerous corresponding angular detents in the relative angular orientation of portions 12L and 12R. In general, hinge 30 (e.g., housing structures forming bearing surfaces 14 and associated fabric hinge structures) may be configured to form a hinge with any suitable number of angular detents (none, one, at least two, at least three, at least 5, at least 10, fewer than 8, fewer than 3, etc.).

Figure 12:
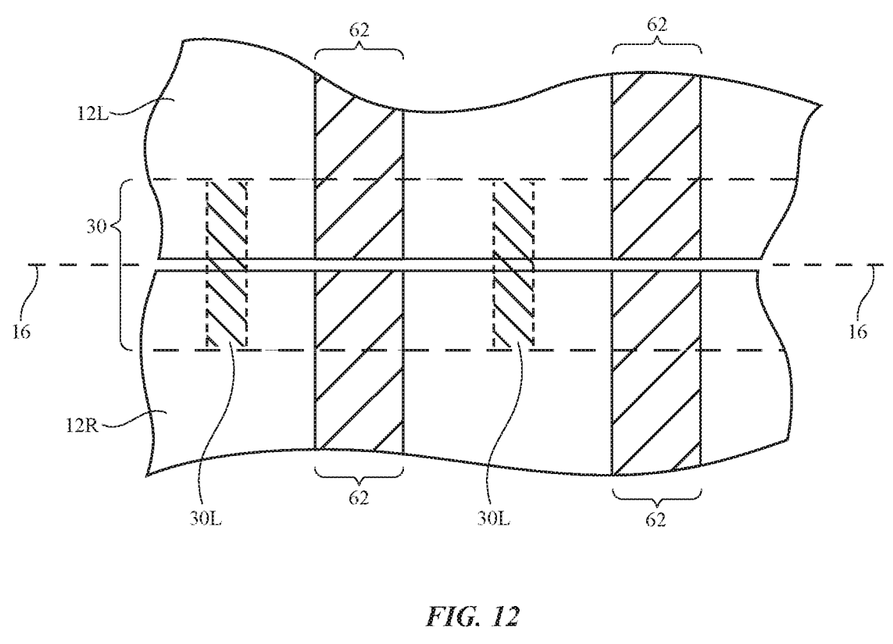
FIG. 12 is a top view of illustrative hinge structures with different properties along a hinge axis in accordance with an embodiment.

Fabric in hinge 30 and/or the detent surfaces and/or other bearing surface features of housing 12 or other hinge structures in item 10 may, if desired, having varying properties (e.g., along the length of hinge axis 16 and/or in other directions). As shown in FIG. 12, for example, portions of housing 12 may have curved bearing surfaces 14 or other properties in regions 62 and may have flattened bearing surfaces 14 (e.g., bearing surfaces 14 with one or more detents) in other locations along the length of axis 16. The properties of the fabric in hinge 30 may also vary along the length of axis 16. For example, at some locations (e.g., locations 30L of FIG. 12) one or more conductive strands may be use to form data and/or power paths between components 18 in housing 12 on opposing sides of hinge 30, whereas other locations may include no conductive strands. As another example, optical properties such as color and reflectance may be varied (e.g., to achieve a desired appearance for hinge 30). Fabric from hinge 30 may, if desired, extend over the outer surface of housing 12 (e.g., to form an item with a fabric that forms an outer housing wall and/or cosmetic wall covering and that also forms fabric layers in hinge 30).

Figure 13:
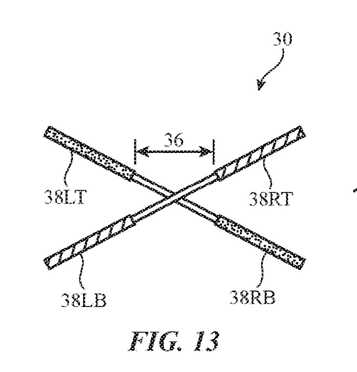
FIG. 13 is a cross-sectional side view of an illustrative fabric hinge in accordance with an embodiment.
Figure 14:
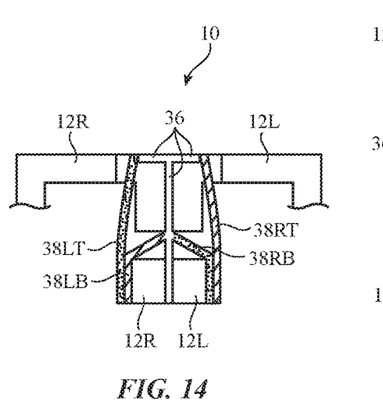
FIG. 14 is a cross-sectional side view of closed housing structures with a fabric hinge of the type shown in FIG. 13 in accordance with an embodiment.
Figure 15:
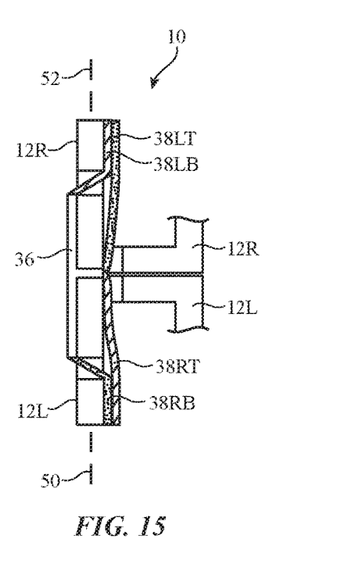
FIG. 15 is a cross-sectional side view of open housing structures with a fabric hinge of the type show in FIG. 13 in accordance with an embodiment.
Figure 16:
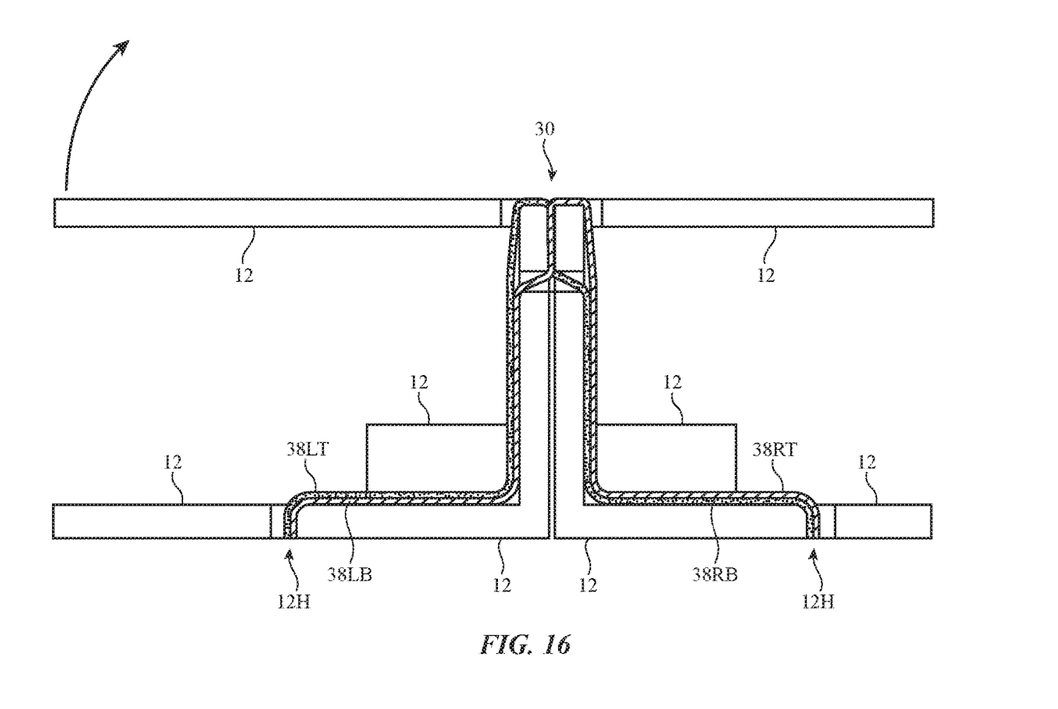
FIG. 16 is a cross-sectional side view of an illustrative electronic device with two movable portions coupled by a fabric hinge in accordance with an embodiment.

The illustrative arrangement of item 10 of FIGS. 13, 14, 15, and 16 shows how hinge 30 may be formed without using curved bearing surfaces 14. FIG. 13 is a cross-sectional side view of fabric hinge 30 showing layers of fabric that may be used in forming hinge 30. FIGS. 14 and 15 show how these layers of fabric may be coupled to housing structures 12. In the configuration of FIG. 14, the housing of item 10 is in a closed position (e.g., a front-to-front closed position). In the configuration of FIG. 15, the housing of item 10 is in an open position (e.g., an arrangement in which housing portions 12L and 12R lie in a common plane and in which item 10 has a flat appearance). FIG. 16 is a cross-sectional side view of another illustrative arrangement for hinge 30 in item 10. A shown in FIG. 16, housing 12 may have openings such as openings 12H through which layers of fabric in hinge 30 may be pulled during manufacturing to help tension strands 32 of hinge 30. In the arrangements of FIGS. 14, 15, 16, and 17, portions of housing 12 adjacent to hinge 30 have rectangular edges, showing how bearing surfaces 14 need not have curved semicircular shapes of the type illustrated in FIGS. 3 and 4. In general, any suitable shapes may be used for housing 12 along hinge axis 16.

Figure 17:
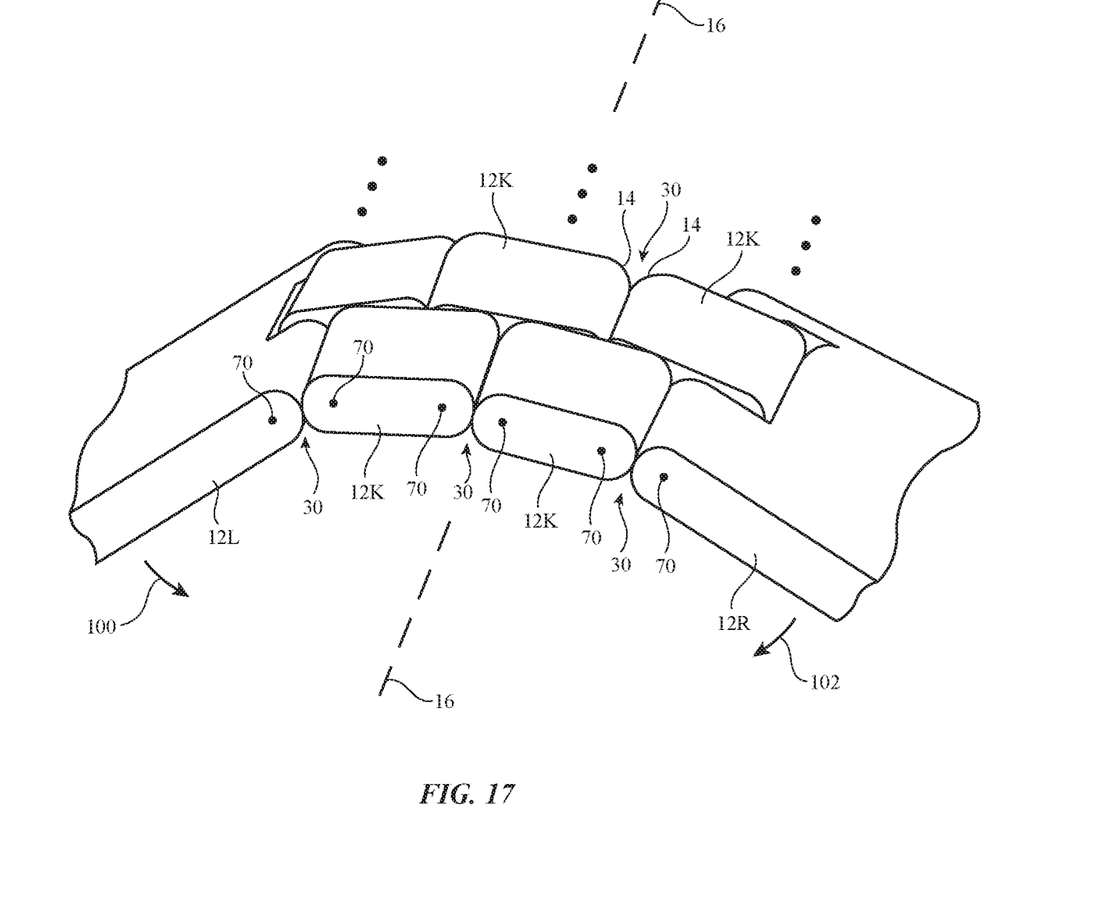
FIG. 17 is a perspective view of an illustrative multi-link hinge formed using fabric hinge structures and housing links in accordance with an embodiment.

FIG. 17 is an illustrative hinge for item 10 showing how a hinge may include links 12K (e.g., housing links formed from metal, polymer, and/or other housing materials). Links 12K may, for example, be formed in columns that are staggered with respect to each other as shown in FIG. 17 and may be interlocked using pins 70 that extend between adjacent links 12K along hinge axis 16 to rotatably couple these adjacent links. Individual fabric hinges 30 (e.g., link-level hinges each with a corresponding link-level hinge axis) may be formed on the bearing surfaces 14 between adjoining links 12K. The inclusion of fabric hinge structures in the hinge links between housing portions 12L and 12R may lock the movement of these housing portions together. For example, if housing portion 12L of FIG. 17 is moved in direction 100 relative to links 12K, housing portion 12R will be caused to rotated by a comparable (e.g., equal) amount 102 in the opposite direction about hinge axis 16 due to the fabric of hinges 30. Links 12K may be inserted into hinge fabric layers during weaving (as an example).

The foregoing is merely illustrative and various modifications can be made to the described embodiments. The foregoing embodiments may be implemented individually or in any combination.

What is claimed is:

1. An item, comprising:
a first structure;
a second structure;
a fabric hinge coupled between the first and second structures and configured to allow the first and second structures to rotate relative to each other about a hinge axis, wherein the fabric hinge comprises:
first and second fabric layers coupled to the first structure;
third and fourth fabric layers coupled to the second structure; and
a center portion, wherein first strands of material in the center portion that run perpendicular to the hinge axis extend into the first fabric layer and into the fourth fabric layer and wherein second strands of material in the center portion that are interspersed with the first strands of material and that run perpendicular to the hinge axis extend into the second fabric layer and the third fabric layer.

2. The item defined in claim 1 wherein the first, second, third, and fourth fabric layers comprise orthogonal strands of material that run orthogonal to the first and second strands.

3. The item defined in claim 2 wherein the first fabric layer comprises a first woven fabric layer in which the first strands are interwoven with a first portion of the orthogonal strands, the second fabric layer comprises a second woven fabric layer in which the second strands are interwoven with a second portion of the orthogonal strands, the third fabric layer comprises a third woven fabric layer in which the second strands of material are interwoven with a third portion of the orthogonal strands, and the fourth fabric layer comprises a fourth woven fabric layer in which the first strands of material are interwoven with the a fourth portion of the orthogonal strands, and wherein the center portion does not include any strands orthogonal to the first and second strands.

4. The item defined in claim 3 wherein the first structure is configured to form a first housing portion of a portable electronic device housing, wherein the second structure is configured to form a second housing portion of the portable electronic device housing, and wherein the item further comprises a keyboard in the first housing portion and a display in the second housing portion.

5. The item defined in claim 2 wherein the center portion does not include strands orthogonal to the first and second strands, wherein the first structure is configured to form a first housing portion of a portable electronic device housing, and wherein the second structure is configured to form a second housing portion of the portable electronic device housing.

6. The item defined in claim 5 further comprising a first display in the first housing portion and a second display in the second housing portion.

7. The item defined in claim 5 wherein the first and second housing portions have respective first and second bearing surfaces configured to bear against each other as the first and second housing portions rotate relative to each other.

8. The item defined in claim 7 wherein the first and second bearing surfaces comprise respective curved surfaces.

9. The item defined in claim 8 wherein the first and second bearing surfaces each have a semicircular cross-sectional profile.

10. The item defined in claim 7 wherein the first and second bearing surfaces each have a planar area configured to form an angular rotation detent.

11. The item defined in claim 1 wherein the first and second structures are configured to form an electronic device housing.

12. The item defined in claim 1 further comprising:
first electrical components in the first structure; and
second electrical components in the second structure, wherein the first strands include conductive strands forming signal paths between the first and second electrical components.

13. The item defined in claim 1 wherein the first and second structures are configured to form a removable cover for an electronic device.

14. The item defined in claim 1 wherein the first and second structures are configured to form a computer housing.

15. The item defined in claim 1 further comprising polymer material in the first fabric layer that binds the first strands to orthogonal strands running perpendicular to the first strands.

16. The item defined in claim 15 wherein polymer material comprises fusible strands.

17. The item defined in claim 1 further comprising openings in the first fabric layer configured to receive portions of the first structure.

18. A fabric hinge comprising:
first and second fabric layers;
third and fourth fabric layers; and
a center portion having a first side coupled to the first and second fabric layers and an opposing second side coupled to the third and fourth fabric layers, wherein first strands of material in the center portion extend across the center portion from the first fabric layer to the fourth fabric layer and wherein second strands of material in the center portion that are interspersed with the first strands of material extend across the center portion from the second fabric layer to the first fabric layer, and wherein the first, second, third, and fourth fabric layers comprise orthogonal strands of material that run perpendicular to the first and second strands.

19. The fabric hinge defined in claim 18 wherein the first fabric layer comprises a first woven fabric layer in which the first strands are interwoven with the orthogonal strands, the second fabric layer comprises a second woven fabric layer in which the second strands are interwoven with the orthogonal strands, the third fabric layer comprises a third woven fabric layer in which the second strands of material are interwoven with the orthogonal strands, and the fourth fabric layer comprises a fourth woven fabric layer in which the first strands of material are interwoven with the orthogonal strands, and wherein the center portion does not include any strands orthogonal to the first and second strands.

20. An electronic device, comprising:
a first housing portion;
first electrical components in the first housing portion;
a second housing portion configured to rotate relative to the first housing portion about a hinge axis;
second electrical components in the second housing portion;
a fabric hinge that extends along the hinge axis, wherein the fabric hinge comprises:
  first and second fabric layers coupled to the first housing portion;
  third and fourth fabric layers coupled to the second housing portion; and
  a center portion, wherein first strands of material in the center portion extend into the first fabric layer and into the fourth fabric layer, wherein second strands of material in the center portion that are interspersed with the first strands of material extend into the second fabric layer and the third fabric layer, and wherein the first, second, third, and fourth fabric layers comprise orthogonal strands of material that run orthogonal to the first and second strands.

21. The electronic device defined in claim 20 further comprising:
conductive strands of material forming signal paths through the fabric hinge.

* * * * *